United States Patent
Inman et al.

(10) Patent No.: US 11,158,433 B2
(45) Date of Patent: Oct. 26, 2021

(54) NUCLEAR THERMAL PROPULSION NUCLEAR REACTOR INTERFACE STRUCTURE

(71) Applicant: BWXT Nuclear Energy, Inc., Lynchburg, VA (US)

(72) Inventors: James Brian Inman, Forest, VA (US); Andrew C. Whitten, Lynchburg, VA (US)

(73) Assignee: BWXT Nuclear Energy, Inc., Lynchburg, VA (US)

( * ) Notice: Subject to any disclaimer, the term of this patent is extended or adjusted under 35 U.S.C. 154(b) by 0 days.

(21) Appl. No.: 16/823,993

(22) Filed: Mar. 19, 2020

(65) Prior Publication Data

US 2020/0357531 A1 Nov. 12, 2020

Related U.S. Application Data

(60) Provisional application No. 62/820,622, filed on Mar. 19, 2019.

(51) Int. Cl.
| | | |
|---|---|---|
| *G21D 5/02* | (2006.01) | |
| *B64G 1/40* | (2006.01) | |
| *B64G 1/42* | (2006.01) | |

(52) U.S. Cl.
CPC .............. *G21D 5/02* (2013.01); *B64G 1/408* (2013.01); *B64G 1/422* (2013.01)

(58) Field of Classification Search
CPC .......... G21D 5/02; B64G 1/408; B64G 1/422; G21C 1/32; G21C 5/10; G21C 15/12; G21C 15/16

USPC .................................................. 376/909, 912
See application file for complete search history.

(56) References Cited

U.S. PATENT DOCUMENTS

| | | | |
|---|---|---|---|
| 3,245,881 A | 4/1966 | Ammon et al. | |
| 3,817,029 A * | 6/1974 | Frisch ...................... | G21D 5/02 376/318 |
| 4,897,240 A | 1/1990 | Sako | |
| 2013/0287157 A1* | 10/2013 | Conway ............... | G21C 13/036 376/203 |

(Continued)

FOREIGN PATENT DOCUMENTS

| | | |
|---|---|---|
| WO | 2019/164617 A2 | 8/2019 |
| WO | 2020/209997 A2 | 10/2020 |

OTHER PUBLICATIONS

Clark, John S., et al. "Nuclear thermal propulsion technology: Results of an interagency panel in FY 1991." (1993). (Year: 1993).*

(Continued)

*Primary Examiner* — Jack W Keith
*Assistant Examiner* — Joshua C Devorkin
(74) *Attorney, Agent, or Firm* — Nelson Mullins Riley & Scarborough LLP

(57) ABSTRACT

An internal interface structure of a nuclear thermal propulsion nuclear reactor including a reactor vessel and a reactor head, including a substantially cylindrical body having a top end, a bottom end, an inner surface, and an outer surface, and an annular flange extending radially-outwardly from the outer surface of the body, wherein the annular flange of the interface structure is mounted between an upper flange of the reactor vessel and a bottom flange of the reactor head.

16 Claims, 13 Drawing Sheets

(56) References Cited

U.S. PATENT DOCUMENTS

2013/0287158 A1* 10/2013 Shargots .................. G21C 7/12
376/219
2017/0263345 A1* 9/2017 Venneri .................... G21D 5/02

OTHER PUBLICATIONS

Caffrey, Jarvis A., et al. "Shielding Development for Nuclear Thermal Propulsion." (2015) (Year: 2015).*
International Search Report and Written Opinion, PCT/US2020/023587, dated Sep. 30, 2020, 7 pages.

* cited by examiner

NUCLEAR THERMAL PROPULSION NUCLEAR REACTOR INTERFACE STRUCTURE

CLAIM OF PRIORITY

This application claims priority to U.S. Provisional Application No. 62/820,622, filed Mar. 19, 2019, the entire disclosure of which is incorporated by reference herein.

GOVERNMENT SUPPORT CLAUSE

This invention was made with government support under Contract 80MSFC17C0006 awarded by the National Aeronautics and Space Administration. The government has certain rights in the invention.

TECHNICAL FIELD

The presently-disclosed invention relates generally to nuclear reactors and, more specifically, to internal support structures for supporting various internal components of nuclear reactors used in nuclear thermal propulsion.

BACKGROUND

The concept of utilizing nuclear thermal propulsion (NTP) to propel spacecraft during space travel is known. In developing the technology related to propelling spacecraft in this manner, it is necessary to be able to test the NTP engines and be able to both assemble and disassemble the engines so that their internal components can be inspected. Preferably, nuclear reactors for NTP engines are compact, lightweight, and due to the extreme conditions in which the nuclear reactors must function, readily assembled and disassembled for rigorous testing during the developmental phase. Various issues exist with regard to existing NTP engine designs, such as Nuclear Engine for Rocket Vehicle Application (NERVA). Specifically, the assembly and disassembly of existing designs is known to be both complicated and time consuming, and free-standing internal plumbing from the outside of the reactor vessel to the internal moderator components within the nuclear core assembly can lead to flow induced vibrations and, therefore, undesired wear of the components.

As noted above, it is important to have the ability to disassemble an NTP engine's reactor vessel after performing hot and cold fire tests to determine the integrity of the internal reactor components. Existing NTP engine designs often require welding operations and, therefore, weld inspection operations when reassembling a previously inspected nuclear reactor. During normal operations of NTP engines, thrust generated from the nozzle is transferred to the reactor vessel, to the reactor head, and onto a thrust vector control structure which interfaces with the spacecraft that is being propelled. During launch of the reactor assembly into space, the reactor vessel must support the weight of the reactor core assembly, such as fuel elements and moderators, as well as launch acceleration loads. As shown in FIG. 13, in some known NTP engine designs, the weight of the core 10 is hung from the support structure 12 and transferred to the reactor vessel by a support plate 14 that is welded into the inner diameter of the reactor vessel 16. As such, when disassembling the nuclear reactor for inspection, various internal components, such as control drums, are often not removable.

As well, routing of coolant from outside known nuclear reactors to the plenums located in the support structure 18 above the core often requires either penetrations through the reactor vessel 20 or through the reactor vessel head 22. When plumbing is routed horizontally (not shown) through a side of the reactor vessel 20, the plumbing must be welded to both the reactor vessel 20 and the support structure 18. This welding locks the support structure 18 to the reactor vessel 20 and does not allow replacement of components below the support plate unless these welds are first cut, possibly damaging the reactor vessel/support structure. The known solution to this routing issue involves routing coolant lines 24 to the top of the reactor internals and interior dome and passing them vertically out through the reactor head, as shown in FIG. 14. The coolant lines 24 are then threaded into a mating flange that is then bolted to the reactor head thereby making a gas seal. High velocity coolant gas used to cool the reactor head flows between the outside of the interior dome and the inside of the reactor head. As such, the coolant gas lines 24, as shown in FIG. 14, are susceptible to flow induced vibration which can lead to tube cracks and ultimately tube failure.

There at least remains a need, therefore, for improved devices for NTP engines that can be more easily assembled and disassembled for inspection and maintenance purposes during testing operations.

SUMMARY OF INVENTION

One embodiment of the present invention includes an internal interface structure of a nuclear thermal propulsion nuclear reactor including a reactor vessel and a reactor head. The interface structure includes a substantially cylindrical body having a top end, a bottom end, an inner surface, and an outer surface, and an annular flange extending radially-outwardly from the outer surface of the body, wherein the annular flange of the interface structure is mounted between an upper flange of the reactor vessel and a bottom flange of the reactor head.

A nuclear thermal propulsion nuclear reactor including a reactor vessel, a reactor head, an internal interface structure, having a substantially cylindrical body with a top end, a bottom end, an inner surface, and an outer surface, and an annular flange extending radially-outwardly from the outer surface of the body, wherein the annular flange of the interface structure is mounted between an upper flange of the reactor vessel and a bottom flange of reactor head.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements.

Figure 1:
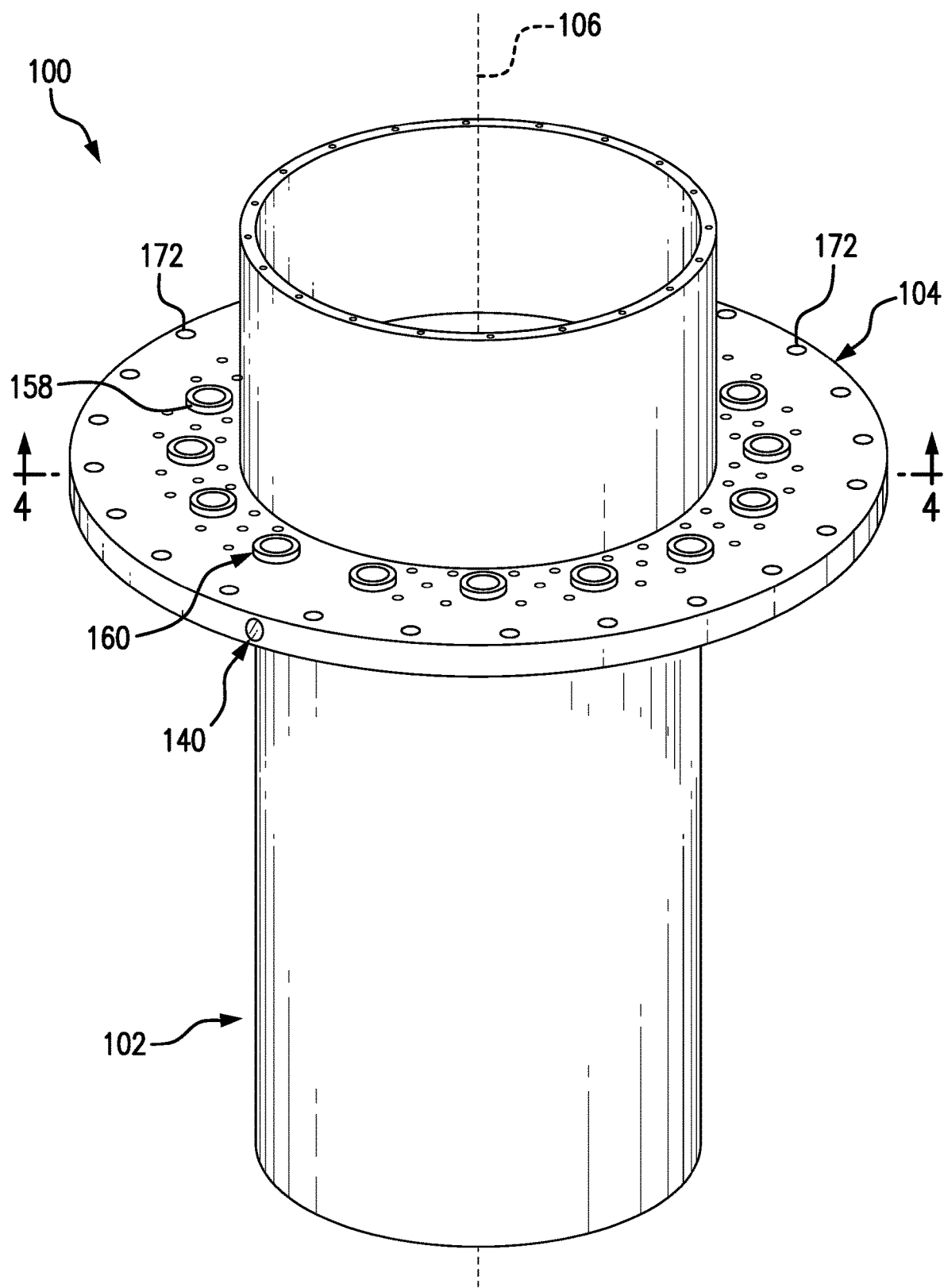
FIG. 1 is a is a top perspective view of an internal interface structure of a nuclear thermal propulsion nuclear reactor in accordance with an embodiment of the present disclosure.

Repeat use of reference characters in the present specification and drawings is intended to represent same or analogous features or elements of the invention according to the disclosure.

DETAILED DESCRIPTION

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Figure 2:
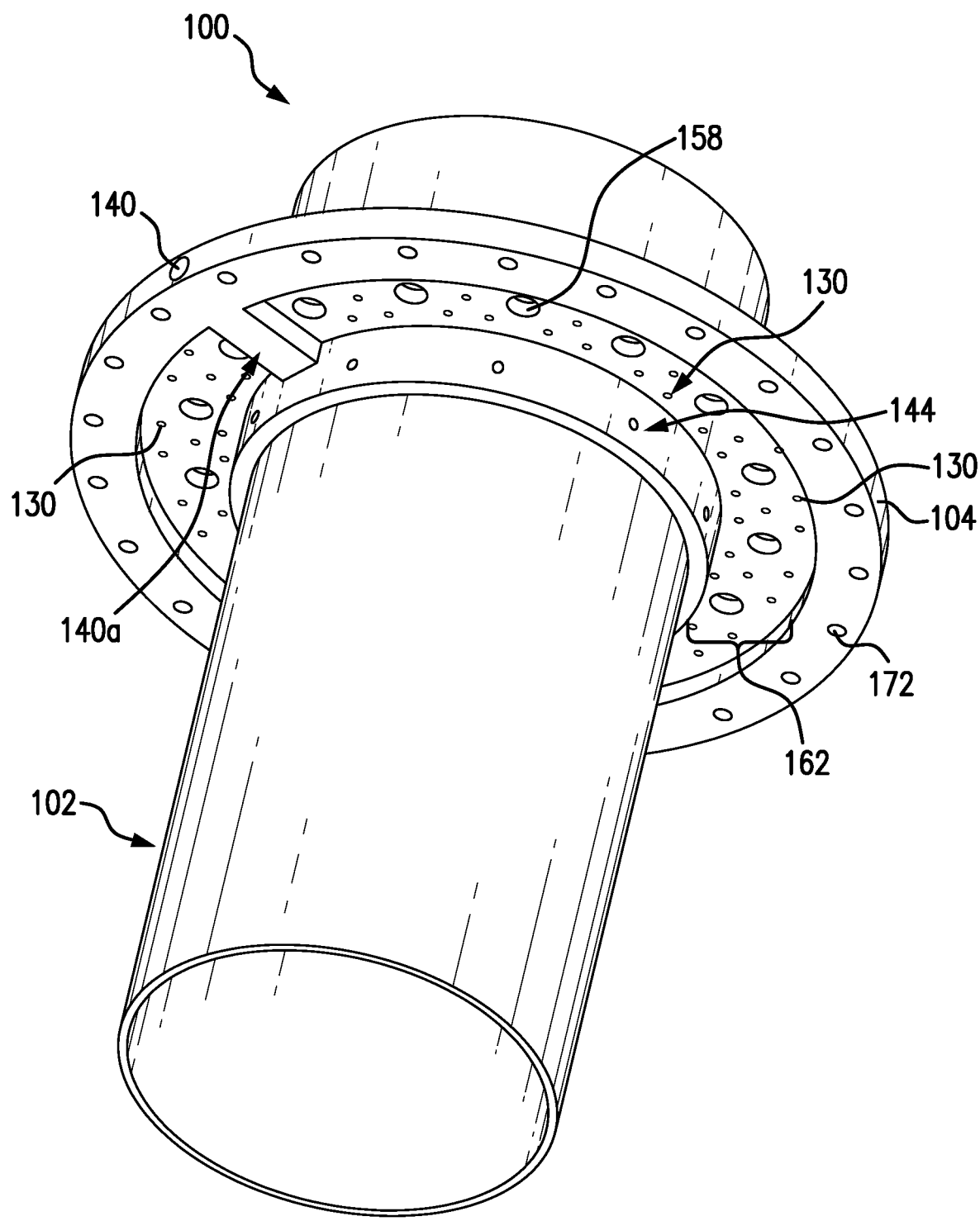
FIG. 2 is a bottom perspective view of the interface structure shown in FIG. 1.
Figure 4:
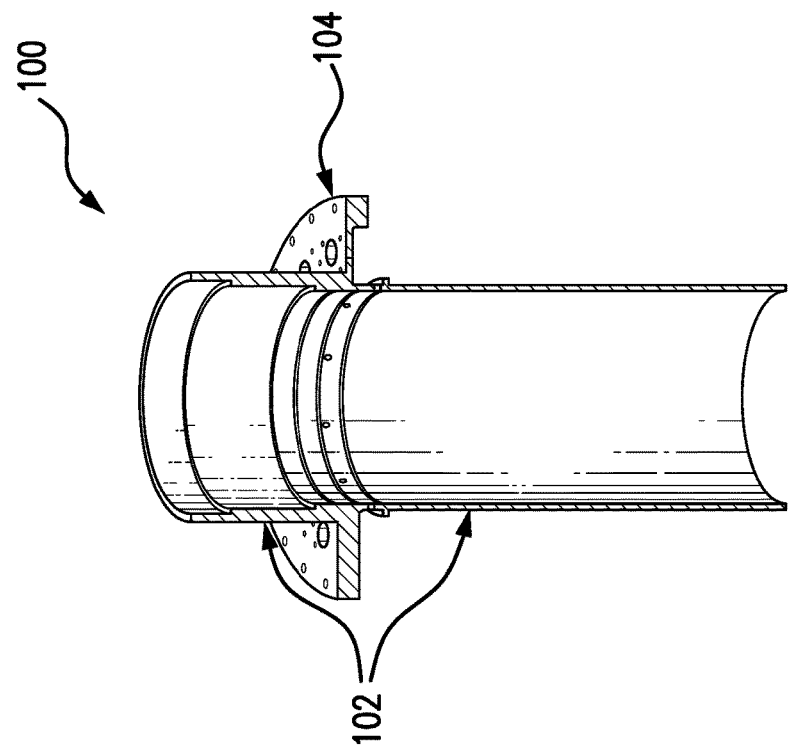
FIG. 4 is a cross-sectional view of the interface structure shown in FIG. 1, taken along line 4-4.
Figure 3:
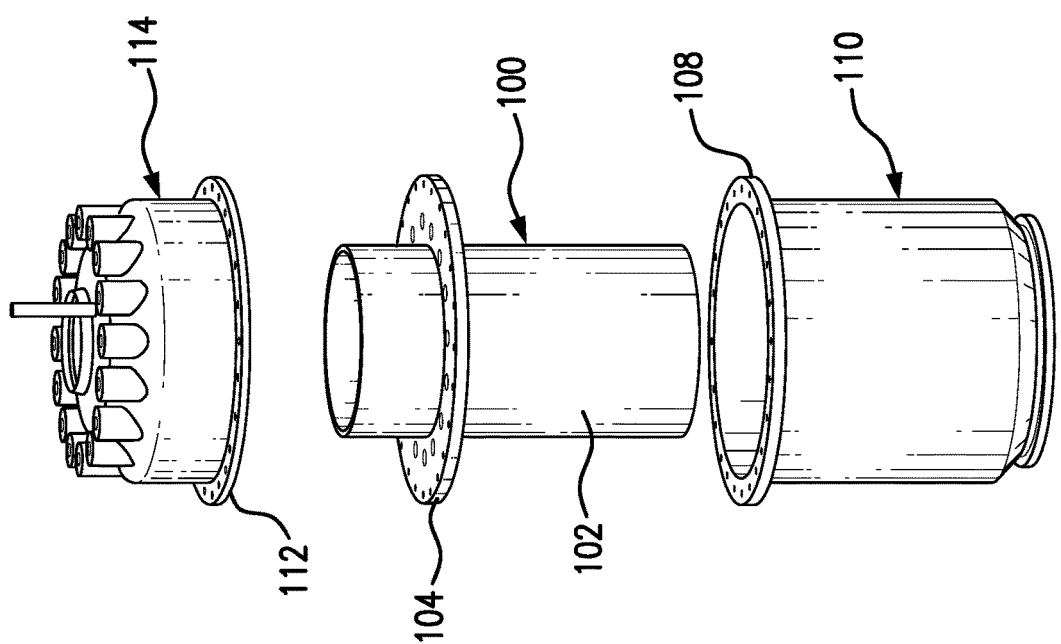
FIG. 3 is an exploded perspective view of the interface structure shown in FIG. 1, and the corresponding reactor head and reactor vessel in which the interface structure is disposed.
Figure 11A:
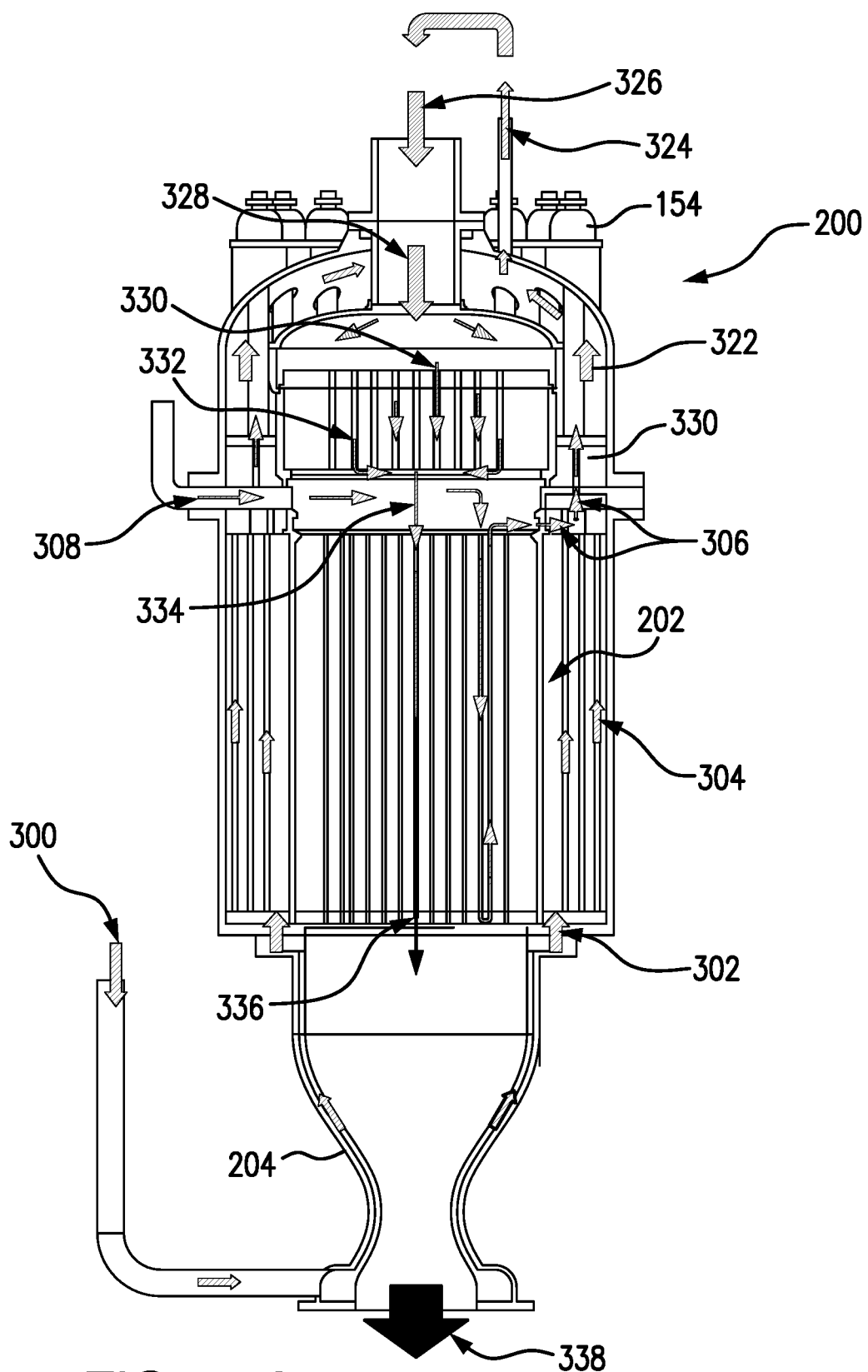
FIGS. 11A and 11B are cross-sectional views of a nuclear thermal propulsion rocket engine including the internal interface structure shown in FIG. 1.
Figure 11B:
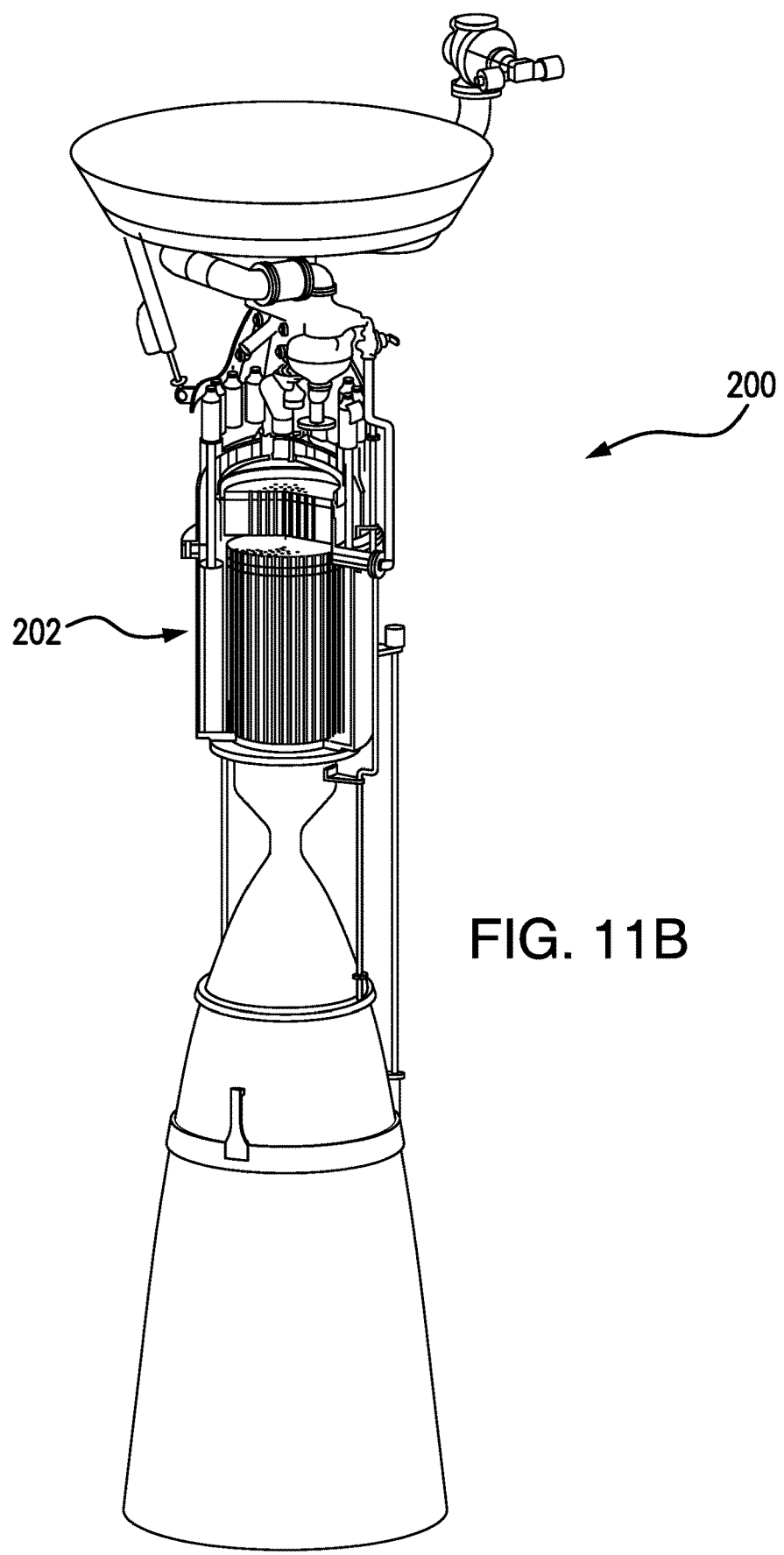

Referring now to the figures, an internal interface structure 100 in accordance with the present disclosure is shown in FIGS. 1 and 2. The interface structure 100 is designed and configured to be used in a nuclear reactor 202 of a nuclear thermal propulsion (NTP) rocket engine 200, as shown in FIGS. 11A and 11B. The interface structure 100 is a single component including a substantially cylindrical body 102 and an annular flange 104 extending radially-outwardly therefrom. The annular flange 104 lies in a plane that is transverse to a longitudinal center axis 106 of the cylindrical body 102 and is configured to be mounted between an upper flange 108 of a corresponding reactor vessel 110 and a lower flange 112 of a corresponding reactor head 114, as best seen in FIG. 3. As shown in FIG. 4, the body 102 of interface structure 100 extends above and below the annular flange 104 and functions as a cylindrical pressure vessel that supports the internal reactor core components, shielding components, reactor controls, and provides pathways for the reactor coolant gas and instrumentation pathways.

Figure 5B:
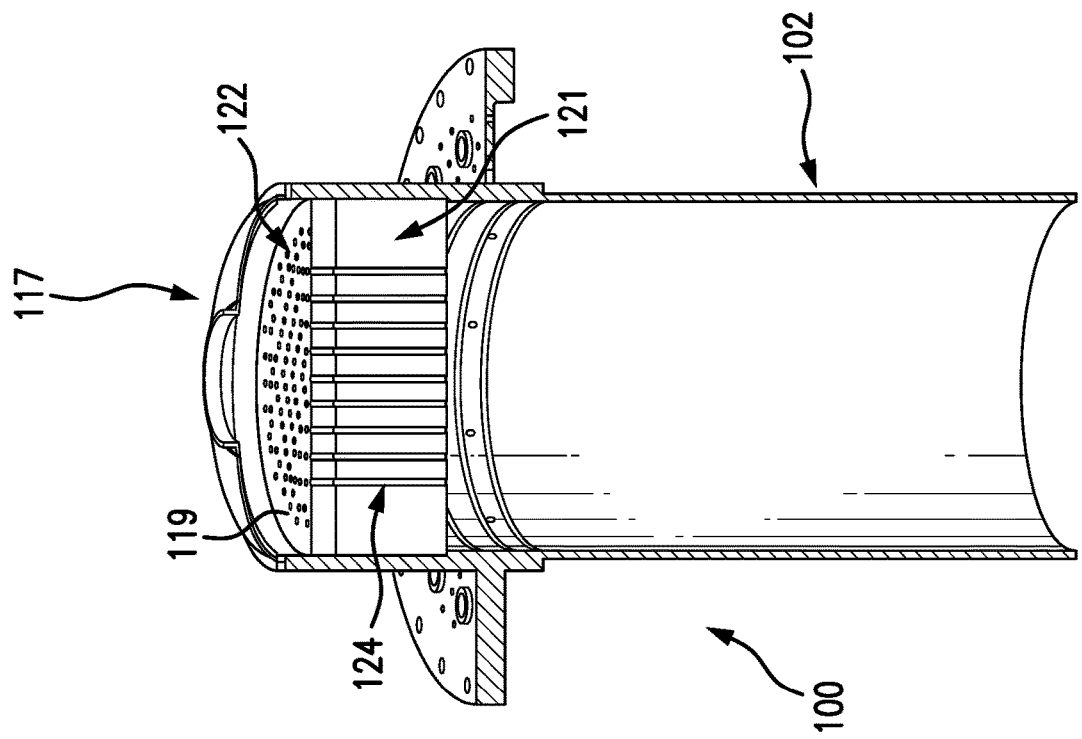
FIG. 5B is a cross-section view of the interface structure shown in FIG. 1, showing internal neutron and gamma shielding.
Figure 5A:
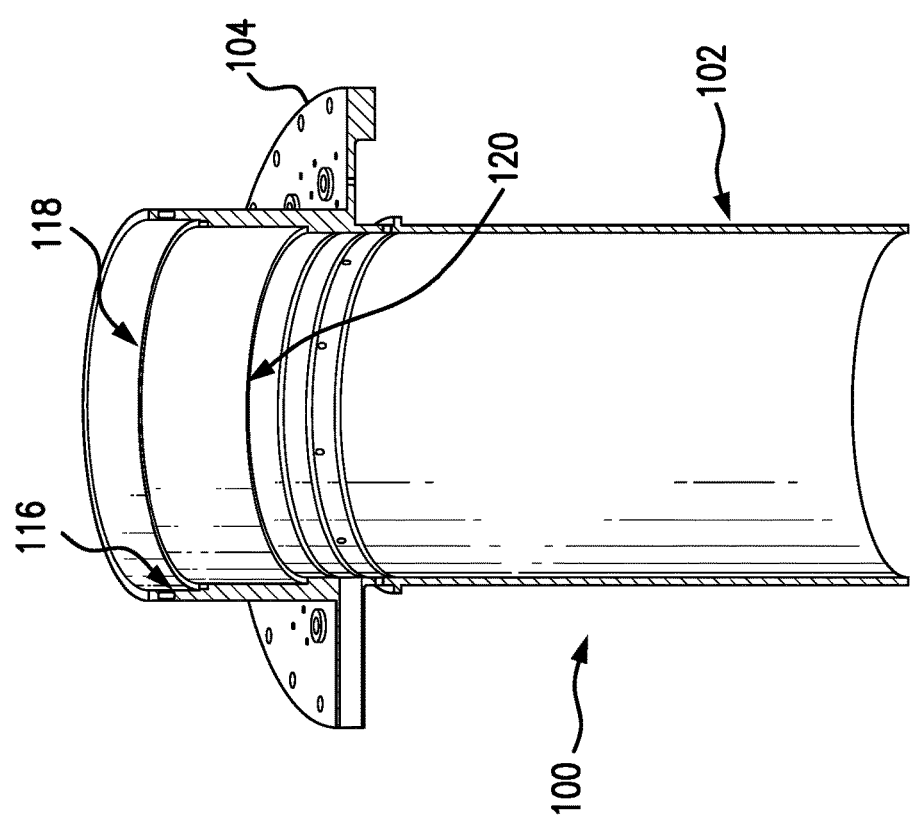
FIG. 5A is a cross-sectional view of the interface structure shown in FIG. 1.

As shown in FIGS. 5A and 5B, the interior of the pressure vessel 102 provides mounting surfaces at 116, 118, and 120 for the interior plenum lid 117, interior gamma shield 119, interior neutron shield 121, respectively, and provides a coolant gas barrier, as discussed in greater detail below. Coolant gas from a turbo pump 210 (FIG. 12), passes through the interior plenum lid 117 and accumulates prior to entering the coolant holes 122 and 124 of the gamma and neutron shields 119 and 121, respectively, located below the interior plenum lid 117. The gamma and neutron shields 119 and 121, respectively, are mounted to the annular ledges that form the mounting surfaces 118 and 120 and are disposed on the inner wall of the pressure vessel 102. The coolant gas passes through the coolant holes 122 and 124 in both shields, thereby removing heat from the shielding material.

Figure 6:
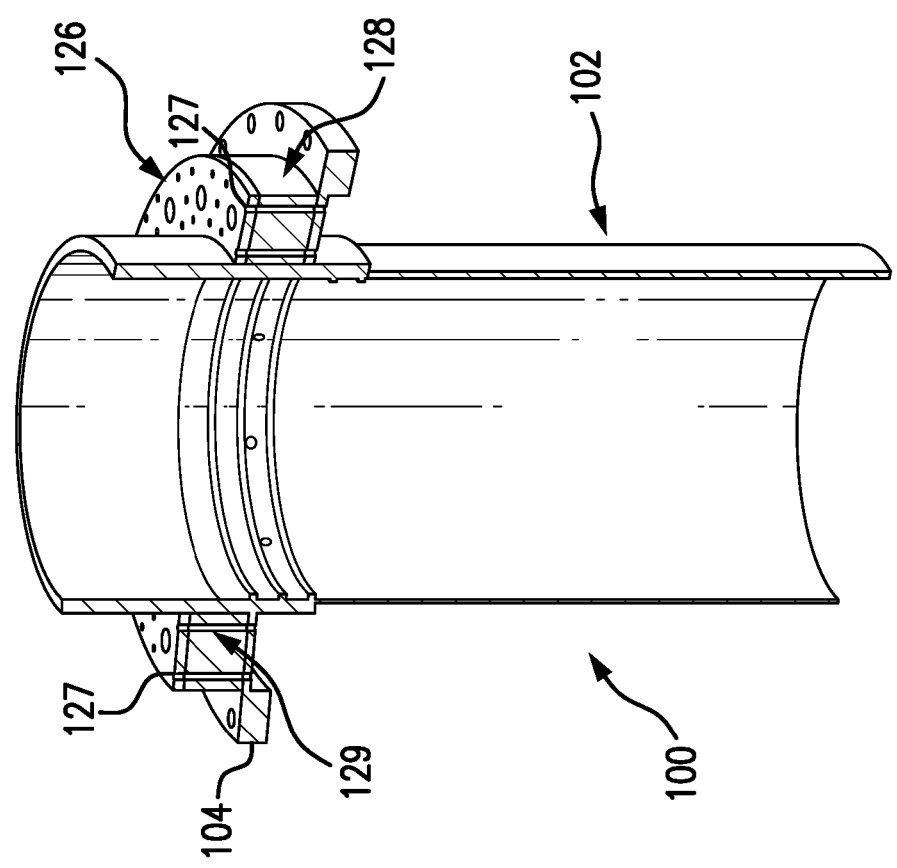
FIG. 6 is a cross-sectional view of the interface structure shown in FIG. 1, showing exterior neutron and gamma shielding.

Referring additionally to FIG. 6, the interface structure 100 also supports and provides cooling pathways through exterior gamma and neutron shields 126 and 128, respectively, located adjacent the outer surface of the pressure vessel 102. Coolant holes 127 and 129 of the exterior gamma and neutron shields 126 and 128, respectively, are aligned with corresponding coolant holes 130 that are formed in the annular flange 104, as best shown in FIG. 2.

Figure 7A:
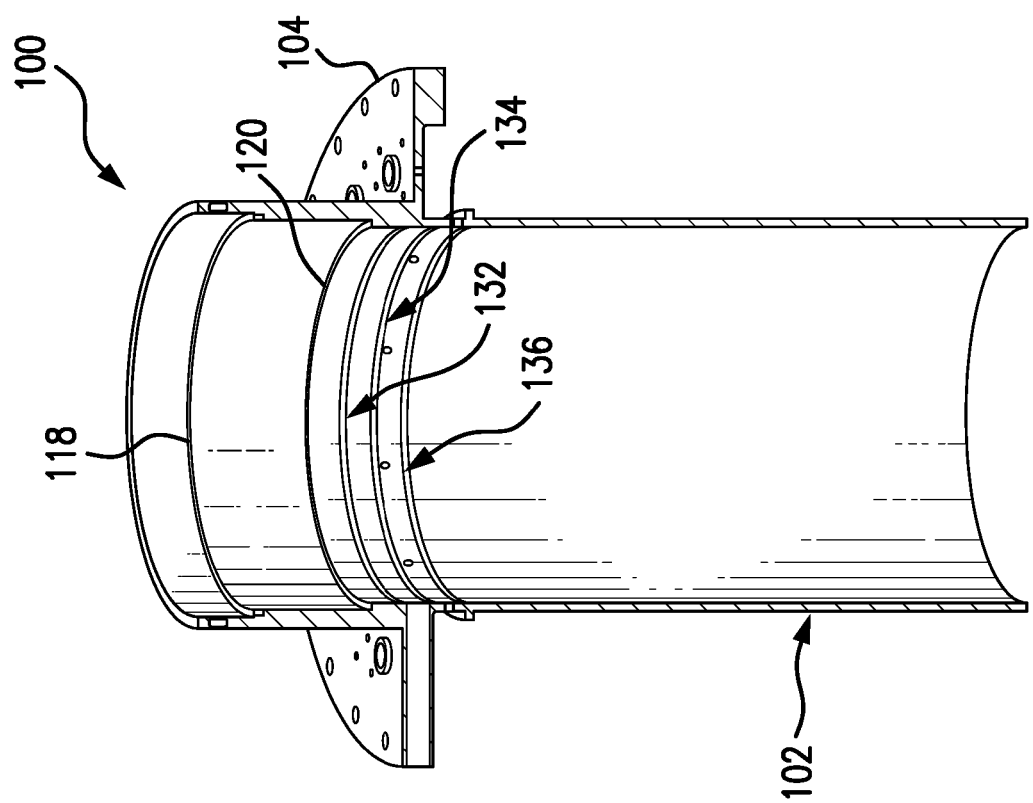
FIG. 7A is a cross-sectional view of the interface structure shown in FIG. 1, indicating plenum plate mounting surfaces.
Figure 7B:
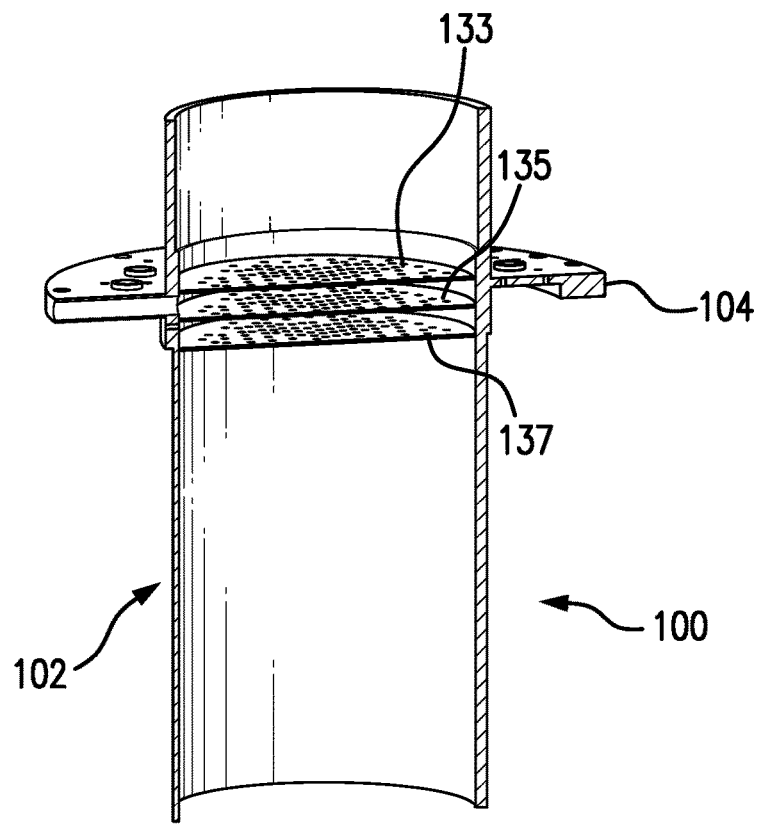
FIGS. 7B and 7C are cross-sectional views of the interface structure shown in FIG. 7A, including plenum plates mounted on the plenum plate mounting surfaces.
Figure 7C:
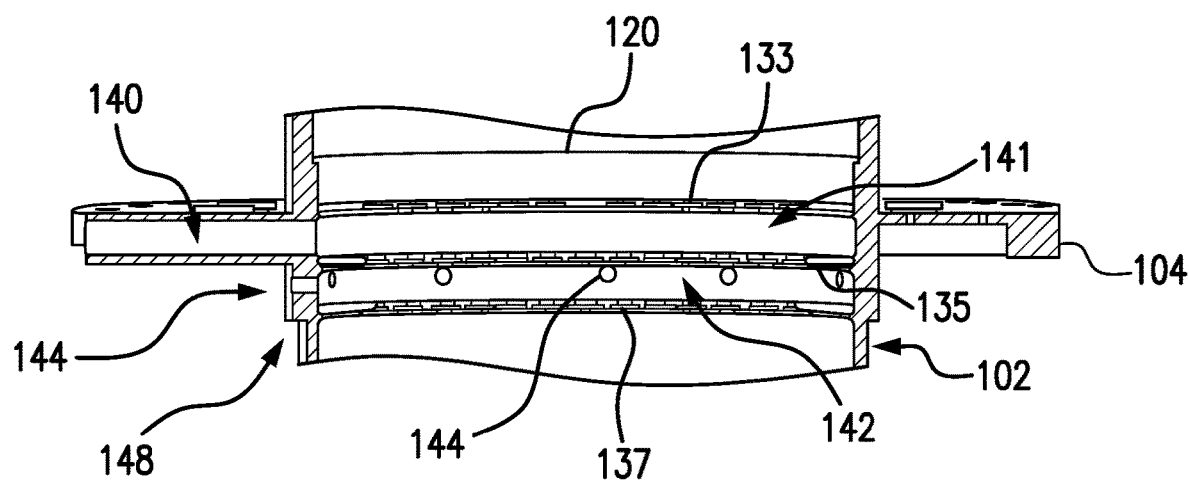

Referring now to FIG. 7A through 7C, a plurality of annular ledges 132, 134 and 136 is provided on the inner surface of the pressure vessel 102 inwardly of the annular flange 104. Each annular ledge supports a corresponding plenum plate 133, 135, and 137, the plenum plates 133, 135, and 137 dividing the coolant gas supply for the moderator and fuel elements. Unlike the fuel elements which only require gas to flow through them, the moderators require plenums to provide coolant gas both into and out of the moderator. Coolant for the moderators is supplied by plumbing that is disposed externally of the reactor vessel. A coolant supply line 140 is formed within the annular flange 104 and allows for a non-welded pathway to the interior of the reactor at the moderator entrance plenum 141. After coolant passes through the moderator, the coolant exits the moderator and enters a moderator exit plenum 142. The moderator coolant gas exits the moderator plenum 142 through penetrations 144 in the pressure vessel wall, as best seen in FIG. 7C and FIG. 2.

Figure 8:
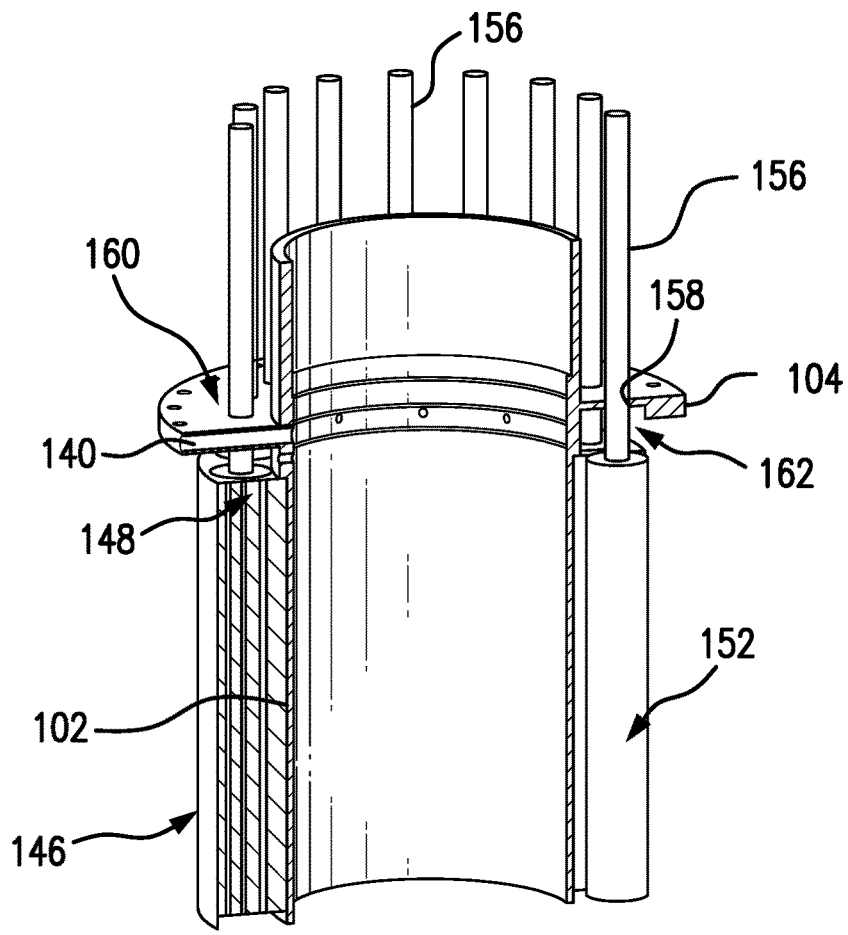
FIG. 8 is a cross-sectional view of the interface structure shown in FIG. 1, showing control drums and a radial reflector mounted thereto.
Figure 10B:
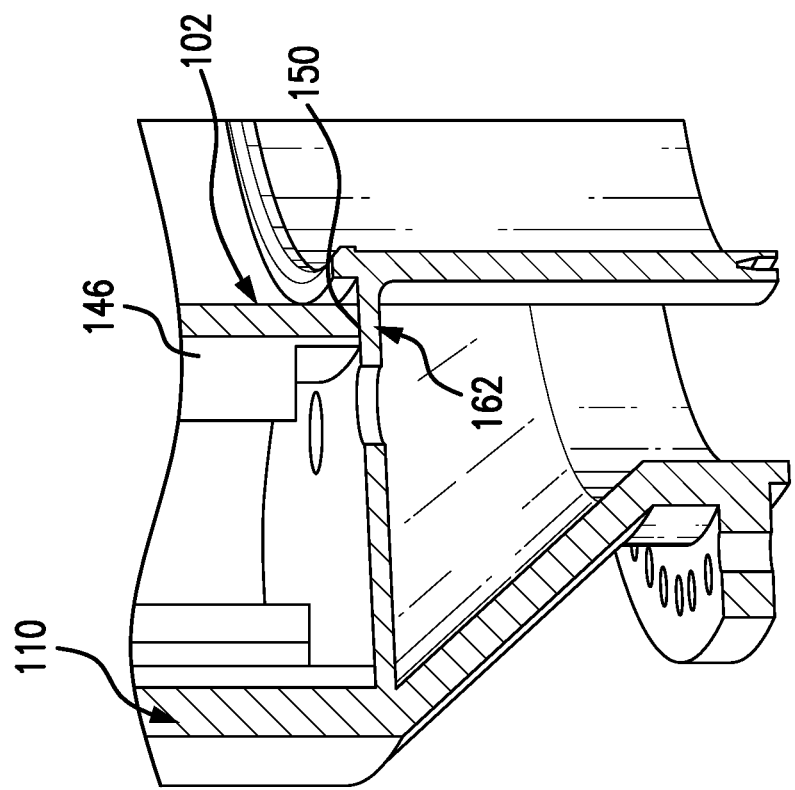
FIGS. 10A and 10B are cross-sectional views of the interface structure shown in FIG. 1, wherein the interface structure is supported by the reactor vessel.
Figure 10A:
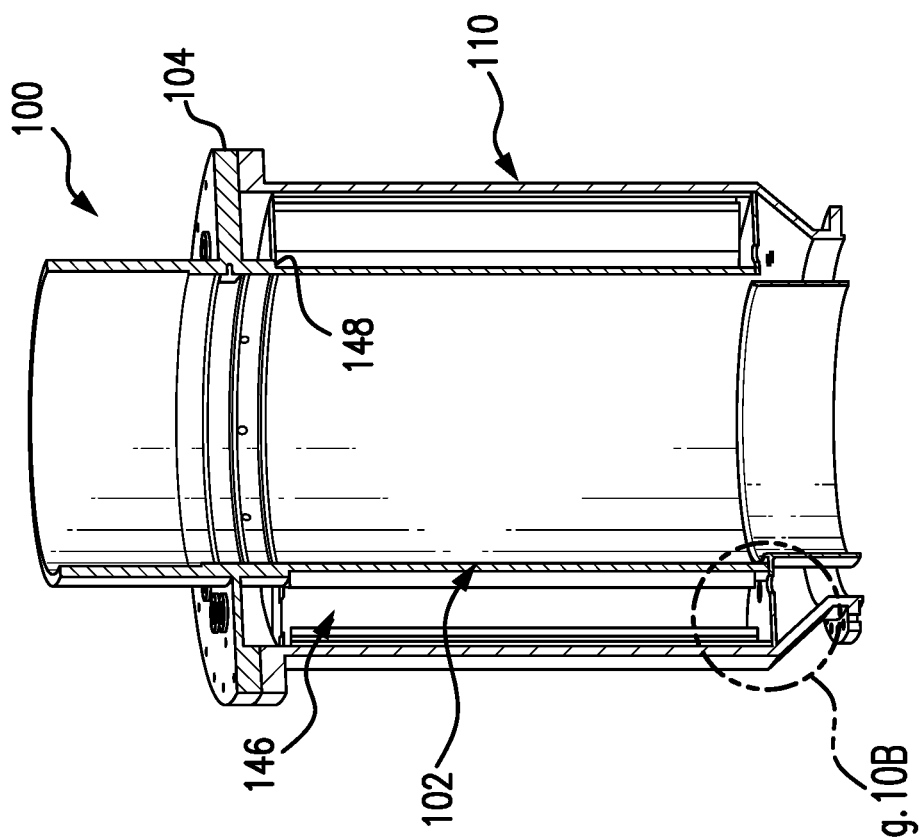

Referring now to FIG. 8, a radial reflector 146 surrounds the reactor core and reflects neutrons back into the core. The radial reflector 146 is located below the annular flange 104 adjacent the outer surface of the pressure vessel 102. An annular ledge 148 is disposed on the outer surface of the pressure vessel 102 beneath the annular flange 104, the annular ledge 148 being configured to abut an upper surface of the reflector 146, thereby holding it in place. The bottom 150 of the radial reflector 146 is supported by the reactor vessel 110 once the reactor vessel 110 is attached to the bottom of the annular flange 104, as best seen in FIGS. 10A and 10B. The radial reflector 146 houses a plurality of control drums 152 that are used to control the criticality of the nuclear reactor. Control drum drive motors 154 (FIG.

11A) are located on the outside of the reactor head and are connected to the control drums 152 by shafts 156 that pass through the annular flange 104. Referring additionally to FIG. 1, the annular flange 104 provides alignment holes 158 and surfaces for supporting bearings 160 for each control drum shaft 156.

As best seen in FIG. 2, the coolant pathway 140 through the annular flange 104 is the only location that which the full flange thickness 140a is required from the cylindrical pressure vessel 102 to the outer perimeter of the annular flange 104. Preferably, most of the remaining material between the mating surfaces of the reactor vessel 110 and reactor head 114, and the interior pressure vessel 102 wall is removed. An annular recess 162 formed by this removal of material becomes an internal coolant mixing area for mixing the coolant exiting from the moderator exit plenum 142 (FIG. 7C) and the coolant exiting the radial reflector 146 and control drums 152 shown in FIG. 8. The mixed coolant then exits through coolant holes 130 that are defined by annular flange 104.

Referring again to FIGS. 10A and 10B, the lower surface 150 of the interface structure's pressure vessel 102 is used to provide a vapor barrier from the interior gas flow through the core and the higher pressure coolant through the radial reflector 146 and control drums 152. A seal 162 located at the thrust chamber assembly interface to the reactor vessel 110 provides the vapor barrier. Additionally, the lower portion of the pressure vessel 102 provides a secondary load path to the annular flange 104 from the thrust exiting the nozzle of the rocket engine (FIGS. 11A and 11B).

Figure 9:
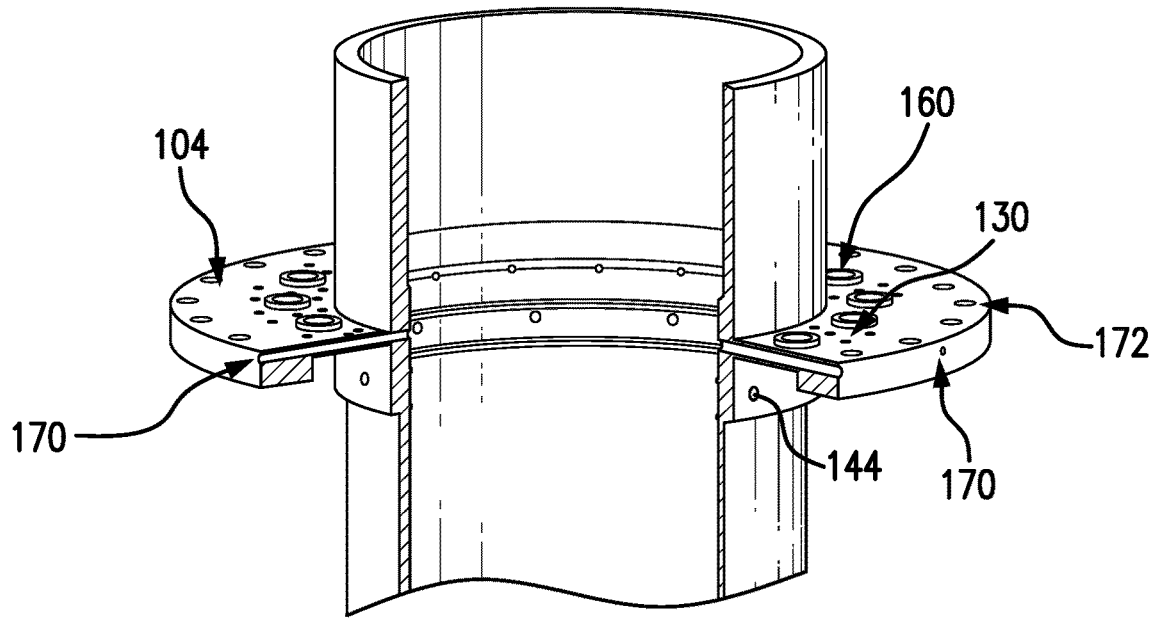
FIG. 9 is a partial cross-sectional view of the interface structure shown in FIG. 1.

Instrumentation required within the reactor vessel for monitoring temperature, pressure, ionizing radiation, structural loading, etc., can be routed by way of direct pathways 170 through the annular flange 104 to the interior of the reactor, as shown in FIG. 9. In prior art designs, instrumentation that was routed either through the reactor head or reactor vessel had to be disconnected when removing or installing the reactor head and/or the reactor vessel. By preferably routing instrumentation cabling through the annular flange 104, the instrumentation cables may be hardwired directly to the corresponding instrument with the first connection being located outside of the pressure boundary. Multiple ports 170 can be radially placed through the circular flange that do not interfere with the cooling holes 130, control drum supports 158/160, and reactor head/vessel mounting holes 172.

As described above, the interface structure 100 allows the internal reactor components to be mounted directly thereto. The components are attached by bolted structures and require no welding. Thus, interior reactor components and parts may be disassembled after testing of the reactor for inspection without having to cut welds. As well, by routing coolant to the moderator through the annular flange 104, coolant penetrations to both the reactor vessel and the reactor head may be avoided. As well, by routing the coolant through the annular flange 104, flow induced vibration issues commonly found in prior art designs may be avoided.

Figure 12:
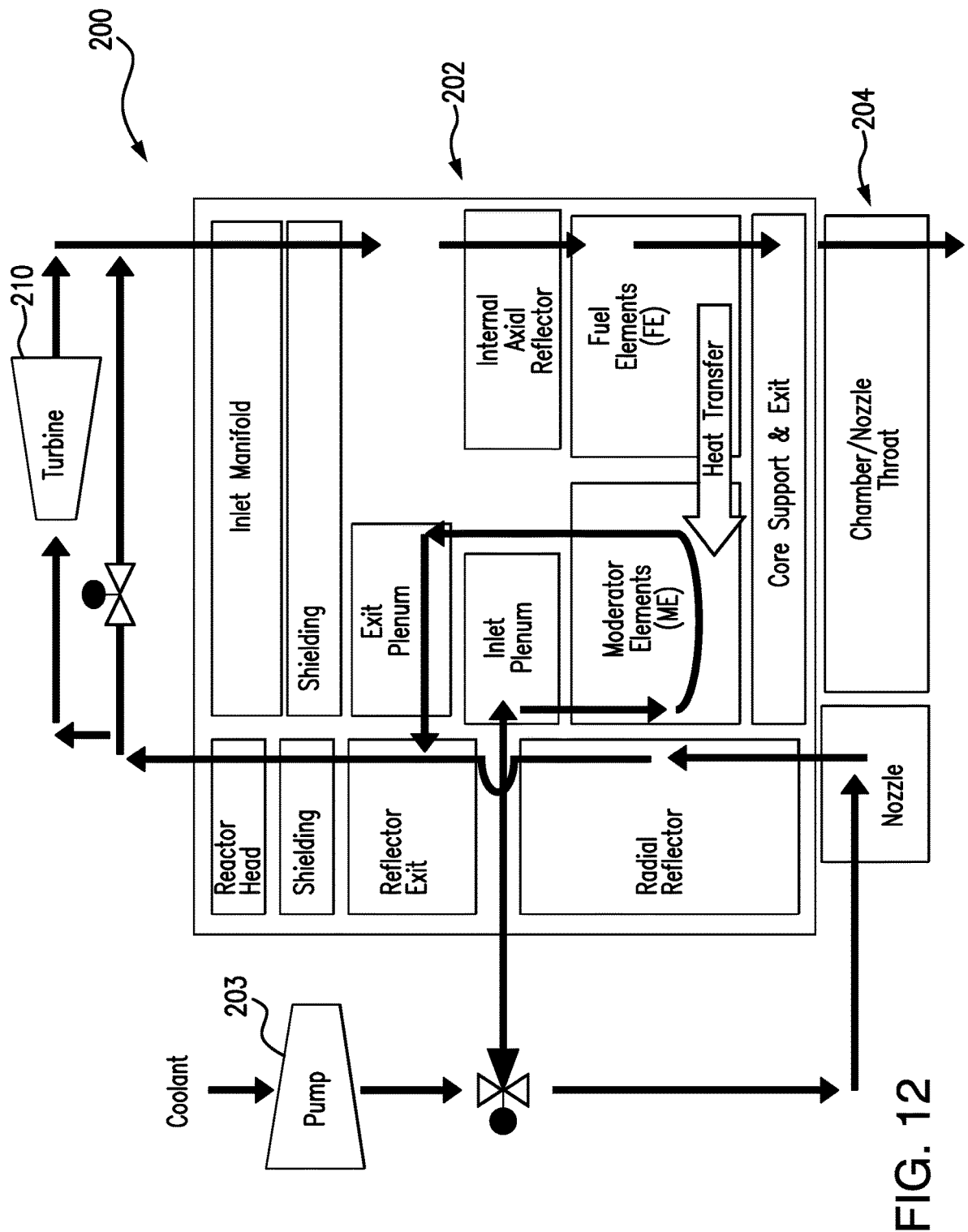
FIG. 12 is a schematic diagram detailing coolant flow through the nuclear thermal propulsion rocket engine shown in FIGS. 11A and 11B.
Figure 13:
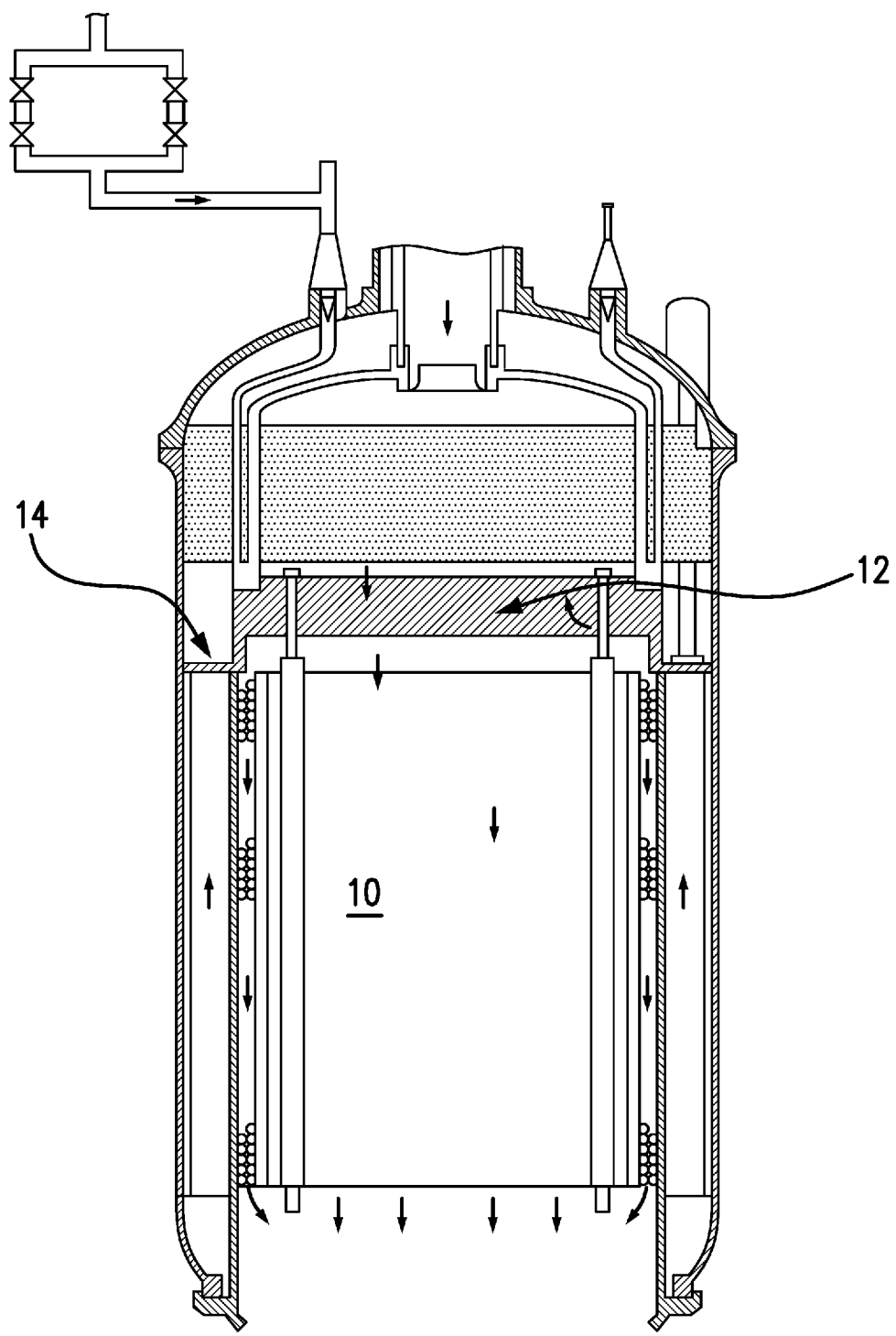
FIG. 13 is a partial cross-sectional view of a prior art Nuclear Engine for Rocket Vehicle Application (NERVA) design, showing the nuclear reactor interface structure design.
Figure 14:
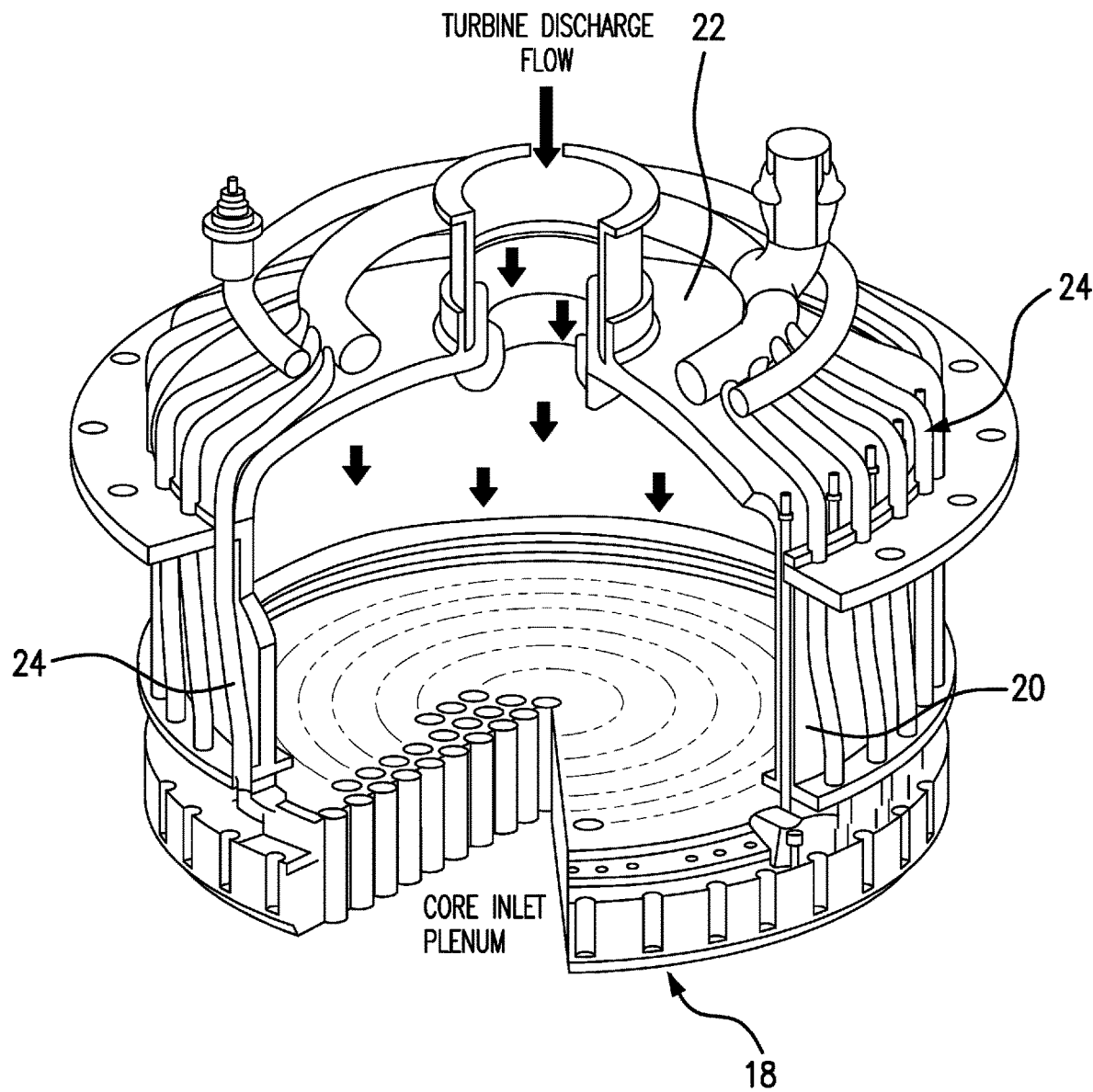
FIG. 14 is a partial cross-sectional view of a prior art nuclear thermal propulsion rocket engine design.

Referring now to FIGS. 11A, 11B and 12, the coolant flow paths through an NTP rocket engine 200 having an interface structure in accordance with the present disclosure is described. As shown, coolant from an external turbo pump 203 enters the nozzle 204 at 300, coolant from the nozzle enters reactor vessel at 302, through holes 339 (FIG. 10B) in the bottom of reactor vessel 110, coolant passes through the reflector and the control drums at 304, coolant exits the reflector and the control drums and enters upper plenum at 306, where internal mixing of the coolant form the nozzle and moderator occurs. Additionally, coolant from the external turbo pump 203 enters coolant pathway 140 of interface structure at 308, coolant next enters moderator entrance plenum at 310, the coolant next enters moderator inlet tube at 312, the coolant next flows through the moderator at 314, after a 180° change in the direction of flow, the coolant passes upwardly through the moderator into the moderator exit plenum 142 and out the moderator exit plenum at 316 through holes 114, enters the upper plenum where it undergoes internal mixing at 306 with the coolant that entered through the nozzle 204. The coolant passes upwardly through the holes 130 in the annular flange of the interface structure and through the holes 129 and 127 of the neutron and gamma shields at 320, passes upwardly through reactor head at 322 into the inlet of a turbo pump 324, the coolant exits the turbo pump at 326 and enters the central dome at 328, after passing through the internal neutron and gamma shields at 330, the coolant enters the fuel element plenum at 332, and passes next into the fuel element inlet tube at 334, ultimately passing through the fuel elements at 336 and exiting the NTP rocket engine nozzle 204 as exhaust at 338.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

The invention claimed is:

1. An internal interface structure of a nuclear thermal propulsion nuclear reactor including a reactor vessel having an upper flange and a reactor head having a bottom flange, comprising:
   a cylindrical body having a top end, a bottom end, an inner surface, an outer surface, and a first, a second, and a third annular ledge formed on an inner surface of the body;
   an annular flange extending radially-outwardly from the outer surface of the body, wherein the annular flange of the interface structure is mounted between the upper flange of the reactor vessel and the bottom flange of the reactor head; and
   a pathway extending through the annular flange and having an inlet formed in an outer perimeter of the annular flange and an outlet formed in the inner surface of the body,
   wherein the first annular ledge is disposed between the top end of the body and the outlet of the pathway, the second ledge is disposed between the bottom end of the body and the outlet of the pathway, and the third ledge is disposed between the second ledge and the bottom end of the body.

2. The interface structure of claim 1, wherein a longitudinal center axis of the pathway is perpendicular to a longitudinal center axis of the body.

3. The interface structure of claim 1, further comprising a plurality of penetrations extending through a portion of the cylindrical body that is disposed between the second annular ledge and the third annular ledge.

4. A nuclear thermal propulsion nuclear reactor comprising:

a reactor vessel;
a reactor head;
an internal face structure, comprising:
- a cylindrical body with a top end, a bottom end, an inner surface, an outer surface, and a first, a second, and a third annular ledge formed on an inner surface of the body;
- an annular flange extending radially-outwardly from the outer surface of the body,
- wherein the annular flange of the interface structure is mounted between an upper flange of the reactor vessel and a bottom flange of the reactor head,
- a pathway extending through the annular flange and having an inlet formed in an outer perimeter of the annular flange and an outlet formed in the inner surface of the body,
- wherein the first annular ledge is disposed between the top end of the body and the outlet of the pathway, the second ledge is disposed between the bottom end of the body and the outlet of the pathway, and the third ledge is disposed between the second ledge and the bottom end of the body.

5. The nuclear thermal propulsion reactor of claim 4, wherein a longitudinal center axis of the pathway is perpendicular to a longitudinal center axis of the body.

6. The nuclear thermal propulsion reactor of claim 4, further comprising:
- a first plenum plate disposed on the first annular ledge;
- a second plenum plate disposed on the second annular ledge; and
- a third plenum plate disposed on the third annular ledge.

7. The nuclear thermal propulsion reactor of claim 6, wherein an inlet plenum is defined between the first plenum plate and the second plenum plate, and an outlet plenum is defined between the second plenum plate and the third plenum plate.

8. The nuclear thermal propulsion reactor of claim 7, further comprising a plurality of penetrations extending through a portion of the cylindrical body that is disposed between the second plenum plate and the third plenum plate.

9. The nuclear thermal propulsion reactor of claim 4, further comprising:
- a plenum lid disposed on a first annular mounting surface of the body of the interface structure;
- an interior gamma shield disposed on a second annular mounting surface of the body of the interface structure; and
- an interior neutron shield disposed on a third annular mounting surface of the body of the interface structure.

10. The nuclear thermal propulsion reactor of claim 9, wherein the first annular mounting surface is defined by a top surface of the top end of the body of the interface structure, and the second annular mounting surface and the third annular mounting surface are each respectively defined by an annular ledge disposed on the inner surface of the body of the interface structure.

11. The nuclear thermal propulsion reactor of claim 4, further comprising an annular exterior gamma shield and an annular exterior neutron shield disposed on the annular flange of the interface structure.

12. A nuclear thermal propulsion nuclear reactor comprising:
a reactor vessel;
a reactor head;
an internal interface structure, comprising:
- a cylindrical body with a top end, a bottom end, an inner surface, an outer surface, a first annular mounting surface defined by a top surface of the top end of the body of the interface structure, and a second annular mounting surface, and a third annular mounting surface that are each respectively defined by an annular ledge disposed on the inner surface of the body of the interface structure;
- an annular flange extending radially-outwardly from the outer surface of the body;
- a plenum lid disposed on the first annular mounting surface of the body of the interface structure;
- an interior gamma shield disposed on the second annular mounting surface of the body of the interface structure; and
- an interior neutron shield disposed on the third annular mounting surface of the body of the interface structure,
- wherein the annular flange of the interface structure is mounted between an upper flange of the reactor vessel and a bottom flange of the reactor head.

13. The nuclear thermal propulsion reactor of claim 12, further comprising:
- a pathway extending through the annular flange and having an inlet formed in an outer perimeter of the annular flange and an outlet formed in the inner surface of the body.

14. The nuclear thermal propulsion reactor of claim 12, further comprising:
- a first annular ledge formed on the inner surface of the body;
- a second annular ledge formed on the inner surface of the body; and
- a third annular ledge formed on the inner surface of the body,
- wherein the first annular ledge is disposed between the top end of the body and the outlet of the pathway, the second ledge is disposed between the bottom end of the body and the outlet of the pathway, and the third ledge is disposed between the second ledge and bottom end of the body.

15. The nuclear thermal propulsion reactor of claim 14, further comprising:
- a first plenum plate disposed on the first annular ledge;
- a second plenum plate disposed on the second annular ledge; and
- a third plenum plate disposed on the third annular ledge.

16. The nuclear thermal propulsion reactor of claim 15, wherein an inlet plenum is defined between the first plenum plate and the second plenum plate, and an outlet plenum is defined between the second plenum plate and the third plenum plate.

* * * * *

UNITED STATES PATENT AND TRADEMARK OFFICE
CERTIFICATE OF CORRECTION

PATENT NO. : 11,158,433 B2  
APPLICATION NO. : 16/823993  
DATED : October 26, 2021  
INVENTOR(S) : James Brian Inman et al.

Page 1 of 1

It is certified that error appears in the above-identified patent and that said Letters Patent is hereby corrected as shown below:

In the Specification  
In Column 2, Line 48, delete "of" and insert --of the--

In the Claims  
In Column 7, Claim 4, Line 3, delete "face" and insert --interface--

Signed and Sealed this  
Twelfth Day of April, 2022

Drew Hirshfeld  
*Performing the Functions and Duties of the*  
*Under Secretary of Commerce for Intellectual Property and*  
*Director of the United States Patent and Trademark Office*